United States Patent
Lawrence et al.

(10) Patent No.: US 9,314,995 B2
(45) Date of Patent: Apr. 19, 2016

(54) COMPOSITES COMPRISING NONWOVEN STRUCTURES AND FOAM

(71) Applicant: National Nonwovens Inc., Easthampton, MA (US)

(72) Inventors: Mark Gregory Lawrence, Westfield, MA (US); Conrad Anthony D'Elia, Westfield, MA (US); Anthony Joseph Centofanti, Avon, CT (US); Paul Anthony Viveiros, Westfield, MA (US)

(73) Assignee: National Nonwovens Inc., Easthampton, MA (US)

( * ) Notice: Subject to any disclaimer, the term of this patent is extended or adjusted under 35 U.S.C. 154(b) by 0 days.

(21) Appl. No.: 13/840,794

(22) Filed: Mar. 15, 2013

(65) Prior Publication Data

US 2014/0273705 A1 Sep. 18, 2014

(51) Int. Cl.
*B32B 5/18* (2006.01)
*B32B 37/24* (2006.01)
(Continued)

(52) U.S. Cl.
CPC ... *B32B 5/18* (2013.01); *B32B 5/06* (2013.01); *B32B 5/08* (2013.01); *B32B 5/245* (2013.01); *B32B 7/12* (2013.01); *B32B 37/24* (2013.01); *D04H 1/46* (2013.01); *D04H 1/49* (2013.01); *D04H 1/498* (2013.01); *B32B 37/12* (2013.01); *B32B 2262/02* (2013.01);
(Continued)

(58) Field of Classification Search
CPC ......... D04H 1/005; D04H 1/54; D04H 1/541; D04H 1/485; D04H 1/46; D04H 1/49; D04H 1/498; B32B 37/04; B32B 5/245

USPC ..................... 442/409; 428/311.51
See application file for complete search history.

(56) References Cited

U.S. PATENT DOCUMENTS 3,908,645 A 9/1975 Sandvig
4,195,112 A 3/1980 Sheard et al.
(Continued)

FOREIGN PATENT DOCUMENTS

EP 0 151 722 A2 8/1985
EP 0 708 191 A2 4/1996
(Continued)

OTHER PUBLICATIONS

International Search Report and Written Opinion mailed Sep. 30, 2014 for Application No. PCT/US2014/022982.
(Continued)

*Primary Examiner* — Aaron Austin
*Assistant Examiner* — Jasper Saberi
(74) *Attorney, Agent, or Firm* — Wolf, Greenfield & Sacks, P.C.

(57) ABSTRACT

The present invention generally relates to nonwoven structures and composites comprising such nonwoven structures, particularly structures incorporating foam, and methods of making and use thereof. One aspect of the invention is generally directed to composites comprising a nonwoven structure immobilized to foam, e.g., using adhesive, needling, or other techniques. The nonwoven structure may comprise any of a variety of fibers. In certain embodiments, the composite may be substantially thermally insulating and/or acoustic insulating. Other aspects of the present invention are generally directed to systems and methods for making such composites, methods of use of such composites, kits comprising such composites, and the like.

36 Claims, 1 Drawing Sheet

(51) Int. Cl.
| | |
|---|---|
| *D04H 1/498* | (2012.01) |
| *D04H 1/49* | (2012.01) |
| *D04H 1/46* | (2012.01) |
| *B32B 5/06* | (2006.01) |
| *B32B 5/08* | (2006.01) |
| *B32B 5/24* | (2006.01) |
| *B32B 7/12* | (2006.01) |
| *E04B 1/88* | (2006.01) |
| *E04B 1/74* | (2006.01) |
| *B32B 37/12* | (2006.01) |

(52) U.S. Cl.
CPC .... *B32B 2266/02* (2013.01); *B32B 2266/0221* (2013.01); *B32B 2266/0278* (2013.01); *B32B 2266/0285* (2013.01); *B32B 2305/022* (2013.01); *B32B 2305/20* (2013.01); *B32B 2307/102* (2013.01); *B32B 2307/304* (2013.01); *B32B 2307/3065* (2013.01); *E04B 1/88* (2013.01); *E04B 2001/742* (2013.01); *Y10T 442/647* (2015.04)

(56) References Cited

U.S. PATENT DOCUMENTS

| | | | |
|---|---|---|---|
| 4,726,987 | A | 2/1988 | Trask et al. |
| 4,780,359 | A | 10/1988 | Trask et al. |
| 4,887,368 | A * | 12/1989 | Latzke ............ 607/111 |
| 5,096,526 | A | 3/1992 | Engwall |
| 5,431,782 | A | 7/1995 | Cassat |
| 5,492,580 | A | 2/1996 | Frank |
| 5,721,177 | A | 2/1998 | Frank |
| 6,383,623 | B1 | 5/2002 | Erb, Jr. |
| 6,579,396 | B2 | 6/2003 | Erb, Jr. |
| 6,749,929 | B1 * | 6/2004 | Enkler et al. ............ 428/304.4 |
| 7,132,025 | B2 | 11/2006 | Dittmar |
| 8,293,042 | B2 | 10/2012 | Lorentz |
| 2003/0191203 | A1 * | 10/2003 | Oohara et al. ............ 521/79 |
| 2004/0198125 | A1 | 10/2004 | Mater et al. |
| 2006/0068675 | A1 * | 3/2006 | Handermann ....... A47C 31/001 442/415 |
| 2006/0105157 | A1 | 5/2006 | Lorentz |
| 2006/0219991 | A1 * | 10/2006 | Braterman et al. ........ 252/601 |
| 2006/0240242 | A1 | 10/2006 | Raghavendran et al. |

FOREIGN PATENT DOCUMENTS

| | | |
|---|---|---|
| EP | 1 074 653 A2 | 2/2001 |
| JP | S64-32995 A | 2/1989 |
| JP | H09-307203 A | 11/1997 |
| JP | 2011-127252 A | 6/2011 |
| NL | 8 502 198 A | 10/1986 |
| WO | WO 03/023108 A1 | 3/2003 |
| WO | WO 2006/076490 A2 | 7/2006 |

OTHER PUBLICATIONS

Invitation to Pay Additional Fees mailed Aug. 5, 2014 for Application No. PCT/US2014/022999.

International Search Report and Written Opinion mailed Dec. 22, 2014 for Application No. PCT/US2014/022999.

Office Communication mailed Jul. 18, 2014 for U.S. Appl. No. 13/840,966.

[No Author Listed], Flammability Requirements for Aircraft Seat Cushions. Federal Aviation Administration. Advisory Circular. Sep. 17, 1986. http://www.faa.gov/documentLibrary/media/Advisory_Circular/AC%2025.853-1.pdf [last accessed Sep. 22, 2014]. 11 pages.

[No Author Listed], Innovative Aerospace Solutions: Ultra-ProTechtor™. TechNews Newsletter for National Nonwowen Technical Textiles. 2012 Spring;1. http://www.nationalnonwovens.com/pdf/TechNews-Spring2012-pg1.pdf [last accessed Sep. 22, 2014]. 1 page.

[No Author Listed], National Nonwovens Introduce Ultra-ProTechtor™ Fire-Blocker. National Nonwovens. Press Release. Mar. 7, 2012. http://www.nationalnonwovens.com/pdf/Press%20Release%20-%20Ultra-ProTechtor.pdf [last accessed Sep. 22, 2014]. 2 pages.

[No Author Listed], Polyaramid Fibre. Goodfellow. May 18, 2012. http://www.goodfellow.com/E/Polyaramid-Fibre.html [last accessed Jul. 10, 2014]. 3 pages.

[No Author Listed], SABIC's High-Performance ULTEM™ Fiber Helps National Nonwovens Create First Fire Blocker Suitable for All Aircraft Seating Dress Covers. Oct. 2, 2012. http://www.sabic-ip.com/gep/en/NewsRoom/PressReleaseDetail/october_02_2012_sabichighperformance.htm [last accessed Sep. 22, 2014]. 2 pages.

[No Author Listed], Standard Test Method for Specific Optical Density of Smoke Generated by Solid Materials. ASTM International. Jul. 10, 2014. http://enterprise.astm.org/SUBSCRIPTION/NewValidateSubscription.cgi?E662-03-HTML [last accessed Jul. 10, 2014]. 39 pages.

[No Author Listed], Technical Guide: Kevlar Aramid Fiber. DuPont. Aug. 8, 2007:I.1-IV.4. http://www2.dupont.com/Kevlar/en_US/assets/downloads/KEVLAR_Technical_Guid.pdf [last accessed Jul. 10, 2014]. 32 pages.

Reinhardt, Development of a New Flammability Test for Aircraft Ducting and Wiring. Federal Aviation Administration. Presentation to the International Aircraft Materials Fire Testing Working Group. Mar. 3-4, 2010. http://www..fire.tc.faa.gov/2010Conference/files/Material_Test_Method_Development/ReinhardtDucting/ReinhardtDuctingWiringUpdate.pdf [last accessed Sep. 22, 2014]. 35 pages.

Office Communication mailed Mar. 13, 2015 for U.S. Appl. No. 13/840,966.

* cited by examiner

COMPOSITES COMPRISING NONWOVEN STRUCTURES AND FOAM

FIELD

The present invention generally relates to nonwoven structures and composites comprising such nonwoven structures, particularly structures incorporating foam, and methods of making and use thereof.

BACKGROUND

Nonwoven structures are typically made from fibers that are assembled together without weaving or knitting the individual fibers together. In some cases, the nonwoven structure may resemble a fabric material. The nonwoven structures may be formed by entangling the individual fibers together mechanically, thermally, chemically, etc. For example, the nonwoven structure may be fabricated using needlepunching or needlefelting technologies, where needles are used to mechanically entangle individual fibers together to form the nonwoven structure. Other technologies for forming nonwoven structures include thermal bonding, hydroentaglement, ultrasonic bonding, or chemical bonding. Such nonwoven structures may be used in a wide range of applications, for instance, for apparel, home furnishings, health care, engineering, industrial, or consumer goods.

SUMMARY

The present invention generally relates to nonwoven structures and composites comprising such nonwoven structures, particularly structures incorporating foam layer, and methods of making and use thereof. One aspect of the invention is generally directed to composites comprising a nonwoven structure immobilized to foam, e.g., using adhesive, needling, or other techniques. The nonwoven structure may comprise any of a variety of fibers. In certain embodiments, the composite may be substantially thermally insulating and/or acoustic insulating. Other aspects of the present invention are generally directed to systems and methods for making such composites, methods of use of such composites, kits comprising such composites, and the like. The subject matter of the present invention involves, in some cases, interrelated products, alternative solutions to a particular problem, and/or a plurality of different uses of one or more systems.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

One aspect of the present invention is generally directed to composites comprising a nonwoven structure and a foam. The foam may be immobilized to or by the nonwoven structure in some cases. Optionally, other materials may also be present in the composite, for example, more than one nonwoven structure or additional foam layers, other layers such as backing layers or protective layers, or the like. The composite may, in some cases, be formed or molded into a desired shape or configuration, for example, as a component within a car, trucks, trains, ships, boats, aircraft, or other vehicle, as part of a floor covering, as a construction material, or the like.

Figure 1:
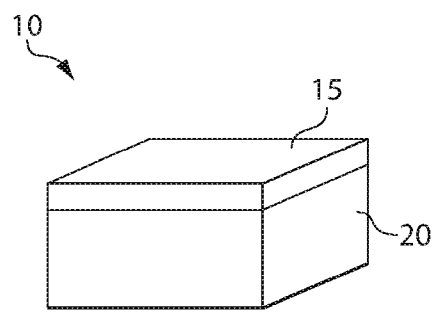
FIG. 1 illustrates a composite in accordance with one embodiment of the invention.
Figure 2:
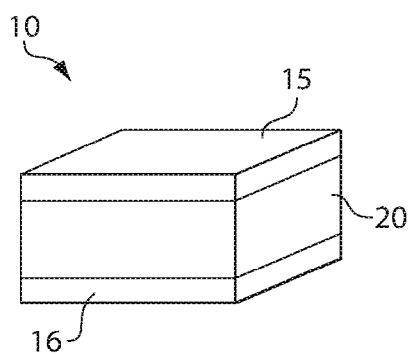
FIG. 2 illustrates a composite in accordance with another embodiment of the invention.
Figure 3:
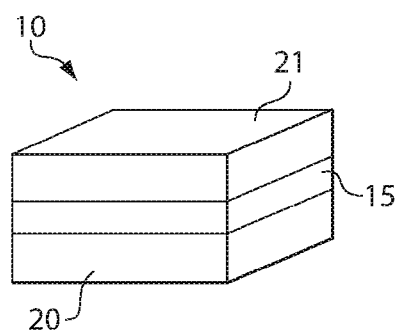
FIG. 3 illustrates a composite in accordance with yet another embodiment of the invention.
Figure 4:
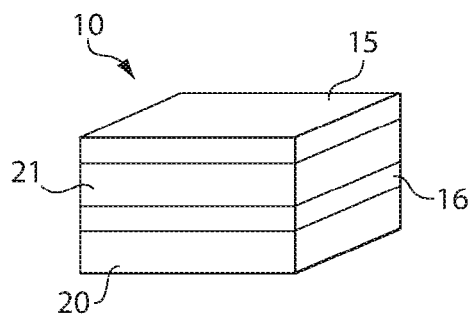
FIG. 4 illustrates a composite in accordance with still another embodiment of the invention.

One embodiment is now described with reference to FIG. 1, although it should be understood that other configurations are also possible in other embodiments of the invention, e.g., as discussed in detail below. In FIG. 1, composite 10 includes nonwoven structure 15 and foam 20. The nonwoven structure may be formed from any of a wide variety of fibers, and may be formed using any suitable technique known in the art or discussed herein. For instance, the nonwoven structure can be formed using techniques such as needlepunching or needlefelting, thermal bonding, hydroentaglement, ultrasonic bonding, or chemical bonding. Non-limiting examples of fibers include polymeric fibers such as those described below. In addition, the nonwoven structure can comprise any number of fiber types that are entangled together (e.g., without weaving) to form the nonwoven structure. For instance, the nonwoven structure may comprise two or more types of fibers, and the fibers can each independently be of any suitable composition, length, mass density, etc.

Also shown in FIG. 1 is foam 20. In FIG. 1, foam 20 is immobilized to or by nonwoven structure 15 to form composite 10, although in other embodiments, other materials may be present between foam 20 and nonwoven structure 15. In this figure, foam 20 may be immobilized to or by nonwoven structure 15 using any suitable technique, e.g., using an adhesive, by needling foam 20 and nonwoven structure 15 together, or the like. Foam 20 may be of any suitable shape or size, and may vary based on the application. For example, in certain applications, foam 20 is a foam that is substantially flame resistant and/or acoustically insulating. Examples of suitable foams include, but are not limited to, polyurethane foams, polyvinylidene fluoride foams, polyimide foams, polyetherimide foams, or the like. The foams can also be open-celled or close-celled, and may be of any suitable cell size.

The composite also may have any suitable shape or size. In some cases, the composite is substantially planar as is shown in FIG. 1, although this is not necessarily a requirement for all embodiments. For example, the composite may be shaped or molded to have different configurations, depending on the application. In addition, the thicknesses of the nonwoven structure and the foam within the composite may be the same or different. For example, the foam may be thicker than the nonwoven structure. In some embodiments, the composite is constructed and arranged to be substantially nonflammable, or to resist flame propagation, e.g., as discussed herein. For example, the composite may be formed of heat-resistant materials, and/or a material of the composite may have a structure or porosity that resists flame propagation. As a non-limiting example, the nonwoven structure may be formed into a structure that allows some gases to pass through the nonwoven structure, but not larger amounts that could potentially facilitate burning or combustion. Surprisingly, such structures, despite having some permeability, offer fire or flame resistance for certain applications.

As mentioned, in various aspects, the nonwoven structure may be formed from any of a wide variety of fibers, and the nonwoven structure may be formed using any suitable technique known in the art or described herein. The nonwoven structure can comprise any number of fiber types that are entangled together to form the nonwoven structure. For instance, the nonwoven structure may include one, two, three, or more types of fibers, e.g., having different compositions, lengths, diameters, densities, etc. Examples of fibers that can be used in the nonwoven structure include, but are not limited to, cotton or other plant fibers, wood fibers, animal fibers, glass fibers, fiberglass, carbon fibers, mineral fibers, metallic fibers, or synthetic or polymeric fibers. Non-limiting examples of polymers that may be used in the polymeric fibers include polyamides such as nylons, novoloid (e.g., Kynol® from American Kynol, novolacs, phenolic fibers, melamines, polyesters, polypropylenes, polyethylenes, polystyrenes, polyacrylic acids, polyacrylonitriles, polyimides, polyetherimides (e.g., Ultem® from SABIC), polyamideimides, polymethyl methacrylates, polyphenelene sulfides, aramids (e.g., meta- or para-aramids, e.g., Kevlar® from Dupont), polybenzimidazoles, polyphenylenebenzobizoxazoles, aromatic polyketones (e.g., polyetheretherketones, polyetherketoneketones, etc.), polyvinyl acetates, polysulfones, polyethersulfones, polyurethanes, polyisobutylenes, liquid crystal polymers, poly(paraphenylene terephthalamide), etc. A polymeric fiber may comprise one or more than one of these polymers, and/or other polymers, or a polymeric fiber can be formed from or consist essentially of one type of polymer.

A nonwoven structure may comprise any number of fiber types. In certain embodiments, the nonwoven structure includes one, two, three, or more fiber types having different compositions, lengths, diameters, densities, etc. For instance, the nonwoven structure may include first fibers comprising polyester and second fibers comprising a meta-aramid, first fibers comprising polyacrylic acid and second fibers comprising polyurethane, first fibers comprising polyacrylonitrile and second fibers comprising polyetherimide, first fibers comprising fiberglass and second fibers comprising polyetherimide, first fibers comprising fiberglass and second fibers comprising polyester, etc.

In addition, in some embodiments, the nonwoven structure comprises fibers having one or more "weights," or more accurately, mass densities. For example, the nonwoven structure may comprise fibers having an average linear mass density of about 20 Denier or less, about 18 Denier or less, about 16 Denier or less, about 15 Denier or less, about 14 Denier or less, about 13 Denier or less, about 12 Denier or less, about 11 Denier or less, about 10 Denier or less, about 9 Denier or less, about 8 Denier or less, about 7 Denier or less, about 6 Denier or less, about 5 Denier or less, about 4 Denier or less, about 3 Denier or less, about 2.5 Denier or less, about 2 Denier or less, about 1.5 Denier or less, about 1 Denier or less, about 0.5 Denier or less, about 0.3 Denier or less, about 0.2 Denier or less, about 0.1 Denier or less, or about 0.05 Denier or less. (1 Denier is the mass in grams for 9,000 linear meters of fiber; expressed as a ratio, this becomes an average linear mass density of the fiber.) In some cases, the nonwoven structure comprises fibers having average linear mass densities at least about 0.05 Denier, at least about 0.1 Denier, at least about 0.2 Denier, at least about 0.3 Denier, at least about 0.5 Denier, of at least about 1 Denier, at least about 1.5 Denier, at least about 2 Denier, at least about 2.5 Denier, at least about 3 Denier, at least about 4 Denier, at least about 5 Denier, at least about 6 Denier, at least about 7 Denier, at least about 8 Denier, at least about 9 Denier, at least about 10 Denier, at least about 11 Denier, at least about 12 Denier, at least about 13 Denier, at least about 14 Denier, at least about 15 Denier, at least about 16 Denier, about 18 Denier, etc. Suitable combinations of any of these are also contemplated in other embodiments of the invention, e.g., the nonwoven structure may comprise first fibers having an average linear mass density of greater than about 2 Denier and less than about 6 Denier. In addition, the densities may be substantially the same, or there may be a range of densities present, for fibers with substantially the same composition within the nonwoven structure.

If more than one type of fiber is present in the nonwoven material, the fibers can independently have the same or different average linear mass densities, including any of the values described herein. As non-limiting examples, the nonwoven material may comprise first fibers having an average linear mass density of about 8 Denier and second fibers having an average linear mass density of 4 Denier, first fibers having an average linear mass density of about 8 Denier and second fibers having an average linear mass density of 2 Denier, first fibers having an average linear mass density of about 16 Denier and second fibers having an average linear mass density of 8 Denier, first fibers having an average linear mass density of about 2 Denier and second fibers having an average linear mass density of 1.5 Denier, first fibers having an average linear mass density of between about 2 Denier and about 6 Denier and second fibers having an average linear mass density of between about 12 Denier and about 20 Denier, etc.

The fibers within the nonwoven structure may also have any suitable diameter (or smallest cross-sectional dimension for fibers that are not in the form of circular cylinders, e.g., for 4DG-shaped fibers). As non-limiting examples, the nonwoven structure can comprise fibers having an average diameter of less than about 500 micrometers, less than about 400 micrometers, less than about 300 micrometers, less than about 200 micrometers, less than about 100 micrometers, less than about 90 micrometers, less than about 80 micrometers, less than about 70 micrometers, less than about 60 micrometers, less than about 50 micrometers, less than about 40 micrometers, less than about 30 micrometers, less than about 25 micrometers, less than about 20 micrometers, less than about 15 micrometers, less than about 10 micrometers, less than about 5 micrometers, less than about 1 micrometer, less than about 0.5 micrometers, less than about 0.3 micrometers, less than about 0.1 micrometers, less than about 0.05 micrometers, etc. In some embodiments, the fibers may have an average diameter of at least about 0.05 micrometers, at least about 0.1 micrometers, at least about 0.3 micrometers, at least about 0.5 micrometers, at least about 1 micrometer, at least about 5 micrometers, at least about 10 micrometers, at least about 15 micrometers, at least about 20 micrometers, at least about 25 micrometers, at least about 30 micrometers, at least about 40 micrometers, at least about 50 micrometers, at least about 60 micrometers, at least about 70 micrometers, at least about 80 micrometers, at least about 90 micrometers, at least about 100 micrometers, at least about 200 micrometers, at least about 300 micrometers, at least about 400 micrometers, etc. Suitable combinations of any of these are also contemplated in some embodiments of the invention, e.g., one of the fibers may have a diameter of between about 50 micrometers and 100 micrometers. If more than one type of fiber is present in the nonwoven material, the fibers independently can have the same or different diameters. In addition, the diameters may be substantially the same, or there may be a range of diameters for fibers with substantially the same composition within the nonwoven structure. Also, fibers having different diameters within a nonwoven structure can independently have the same or different compositions.

The fibers within the nonwoven structure can also have any suitable length, and the lengths of the fibers may be substantially the same, or there may be a range of lengths present within the nonwoven structure for fibers with substantially the same composition. For example, the fibers may have a length of about 15 inches or less, about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2 inches or less, or about 1 inch or less, depending on the embodiment. (1 inch is 25.4 mm.) In some embodiments, the fibers may also have a length of at least about 1 inch, at least about 2 inches, at least about 3 inches, at least about 4 inches, at least about 5 inches, at least about 6 inches, at least about 7 inches, at least about 8 inches, at least about 9 inches, at least about 10 inches, at least about 11 inches, at least about 12 inches, etc., and/or combinations of any of these (e.g., the fibers within the nonwoven structure may have a length of between about 3 inches and about 8 inches). If more than one fiber type is present in the nonwoven material, the fiber types can independently have the same or different lengths. Fibers having different lengths within a nonwoven structure can also independently have the same or different compositions. In addition, the lengths may be substantially the same, or a range of lengths may be present for fiber types with substantially the same composition within the nonwoven structure.

If more than one fiber type is present within a nonwoven structure, the fiber types may be present in any suitable ratio. This can be determined, for example, using mass ratios. For example, if two types of fibers are present within a nonwoven structure, the mass ratio of first fibers to second fibers within the nonwoven structure can be between about 50:1 and about 1:50, between about 40:1 and about 1:40, between about 30:1 and about 1:30, between about 20:1 and about 1:20, between about 10:1 and about 1:10, between about 5:1 and about 1:5. As additional non-limiting examples, the mass ratio of the first fibers to the second fibers within the nonwoven structure can be between about 50:1 and about 1:1, between about 40:1 and about 1:1, between about 30:1 and about 1:1, between about 20:1 and about 1:1, between about 10:1 and about 1:1, between about 5:1 and about 1:1, between about 2:1 and about 1:1, etc.

In certain embodiments, the first fibers comprise at least about 5% (by mass) of all of the fibers within the nonwoven structure with the balance being the second fiber (and/or other fibers, if present). In certain instances, the first fibers comprise at least about 10%, at least about 15%, at least about 20%, at least about 25%, at least about 30%, at least about 35%, at least about 40%, at least about 45%, at least about 50%, at least about 55%, at least about 60%, at least about 65%, at least about 70%, at least about 75%, at least about 80%, at least about 85%, at least about 90%, or at least about 95% of all of the fibers within the nonwoven structure. In some cases, the first fibers comprise no more than about 95%, no more than about 90%, no more than about 85%, no more than about 80%, no more than about 75%, no more than about 70%, no more than about 65%, no more than about 60%, no more than about 55%, no more than about 50%, no more than about 45%, no more than about 40%, no more than about 35%, no more than about 30%, no more than about 25%, no more than about 20%, no more than about 15%, no more than about 10%, or no more than about 5% of all of the fibers within the nonwoven structure. Suitable combinations of any of these are also contemplated in other embodiments of the invention. For instance, the first fibers can comprise at least about 10% and no more than about 90% of all of the fibers within the nonwoven structure. In addition, it should be understood that the invention is not limited to only two types of fibers within a nonwoven structure, and three, four, five, or more types of fibers may be present within the nonwoven structure in certain embodiments.

The nonwoven structure, when formed, may have any suitable thickness, weight, or density. For example, the thickness of the nonwoven structure, or the smallest dimension of the nonwoven structure, may be about 0.1 inches, about 0.25 inches, about 0.5 inches, about 0.75 inches, about 1 inch, about 1.25 inches, about 1.5 inches, about 1.75 inches, about 2 inches, about 2.25 inches, about 2.5 inches, about 2.75 inches, about 3 inches, about 3.5 inches, about 4 inches, about 4.5 inches, about 5 inches, about 6 inches, about 7 inches, about 8 inches, about 9 inches, about 10 inches, about 12 inches, etc. As other non-limiting examples, the nonwoven structure can have a density of about 5 $oz/yd^2$ or more, about 10 $oz/yd^2$ or more, about 15 $oz/yd^2$ or more, about 20 $oz/yd^2$ or more, about 25 $oz/yd^2$ or more, about 30 $oz/yd^2$ or more, about 40 $oz/yd^2$ or more, about 50 $oz/yd^2$ or more, about 60 $oz/yd^2$ or more, about 70 $oz/yd^2$ or more, about 80 $oz/yd^2$ or more, about 90 $oz/yd^2$ or more, about 100 $oz/yd^2$ or more, about 110 $oz/yd^2$ or more, about 120 $oz/yd^2$ or more, about 125 $oz/yd^2$ or more, about 150 $oz/yd^2$ or more, about 175 $oz/yd^2$ or more, about 200 $oz/yd^2$ or more, about 225 $oz/yd^2$ or more, about 250 $oz/yd^2$ or more, about 275 $oz/yd^2$ or more, about 300 $oz/yd^2$ or more, about 350 $oz/yd^2$ or more, about 400 $oz/yd^2$ or more, about 450 $oz/yd^2$ or more, about 500 $oz/yd^2$ or more, about 550 $oz/yd^2$ or more, about 600 $oz/yd^2$ or more, about 650 $oz/yd^2$ or more, about 700 $oz/yd^2$ or more, about 750 $oz/yd^2$ or more, about 800 $oz/yd^2$ or more, about 850 $oz/yd^2$ or more, about 900 $oz/yd^2$ or more, about 1,000 $oz/yd^2$ or more, etc. (1 oz is 28.3495 g and 1 yd is 0.9144 m).

The nonwoven structure, in some embodiments, has a relatively low permeability to gases such as air or other types of gases. Having relatively low permeability to gases can allow the nonwoven structure to be relatively flame resistant, and/or to act as acoustic insulation, at least in some cases. For instance, for relatively low permeabilities, the nonwoven structure may have fibers that are relatively tightly arranged, resulting in relatively small pores or spaces between the fibers that would allow gases such as air to pass, and/or the fibers can be relatively large, resulting in spaces between the fibers that are relatively small. In addition, the nonwoven structure can also be relatively thick in some embodiments to slow the passage of gases through the structure. Examples of suitable thicknesses include those previously described.

Accordingly, in one set of embodiments, the nonwoven structure is constructed and arranged, through any suitable combination of thickness, fiber dimensions, fiber materials, arrangement of fibers, etc. within the nonwoven structure, such that, for a pressure differential of 0.5 inches of water (1 in H$_2$O is 248.84 Pa), the permeability of air through the nonwoven structure is no more than about 100 ft$^3$/min/ft$^2$ at standard pressure and temperature, and in some cases, no more than about 75 ft$^3$/min/ft$^2$, no more than about 50 ft$^3$/min/ft$^2$, no more than about 25 ft$^3$/min/ft$^2$, no more than about 20 ft$^3$/min/ft$^2$, no more than about 15 ft$^3$/min/ft$^2$, no more than about 10 ft$^3$/min/ft$^2$, no more than about 5 ft$^3$/min/ft$^2$, no more than about 3 ft$^3$/min/ft$^2$, no more than about 2 ft$^3$/min/ft$^2$, or no more than about 1 ft$^3$/min/ft$^2$. However, in some embodiments, some gas permeability within the nonwoven structure is desired. For instance, the permeability of air through the nonwoven structure can be at least about 0.5 ft$^3$/min/ft$^2$ under the above-described conditions, and in some cases, at least about 1 ft$^3$/min/ft$^2$, at least about 2 ft$^3$/min/ft$^2$, at least about 3 ft$^3$/min/ft$^2$, at least about 5 ft$^3$/min/ft$^2$, at least about 10 ft$^3$/min/ft$^2$, at least about 15 ft$^3$/min/ft$^2$, at least about 20 ft$^3$/min/ft$^2$, at least about 25 ft$^3$/min/ft$^2$, at least about 25 ft$^3$/min/ft$^2$, at least about 50 ft$^3$/min/ft$^2$, or at least about 75 ft$^3$/min/ft$^2$. Combinations of any of the above permeabilities are also possible in certain cases, e.g., a permeability of greater than about 1 ft$^3$/min/ft$^2$ and less than about 10 ft$^3$/min/ft$^2$. In addition, in some embodiments, the nonwoven structure can also contain compounds that are able to alter its permeability, for example, certain inorganic compounds such as colloidal silica.

Gases may flow through spaces between the fibers in the nonwoven structure, and the spaces may be characterized as having an equivalent diameter or porosity that gases are able to flow through. The porosity within the nonwoven structure may be determined by any suitable technique known to those of ordinary skill in the art, e.g., through microscopy or electron microscopy, capillary flow porometry, etc. For example, in one set of embodiments, the nonwoven structure has an number average porosity (with pore size being the smallest cross-sectional dimension of the pore) determined by microscopy or a mean flow pore size determined by porometry of less than about 1 cm, less than about 5 mm, less than about 3 mm, less than about 1 mm, less than about 0.5 mm, or less than about 0.3 mm. The average porosity may also be less than about 100 micrometers, less than about 90 micrometers, less than about 80 micrometers, less than about 70 micrometers, less than about 60 micrometers, less than about 50 micrometers, less than about 40 micrometers, less than about 30 micrometers, less than about 25 micrometers, less than about 20 micrometers, less than about 15 micrometers, less than about 10 micrometers, less than about 5 micrometers, less than about 1 micrometer, etc. The nonwoven structure can also have a porosity of at least about 1 micrometer, at least about 5 micrometers, at least about 10 micrometers, at least about 15 micrometers, at least about 20 micrometers, at least about 25 micrometers, at least about 30 micrometers, at least about 40 micrometers, at least about 50 micrometers, at least about 60 micrometers, at least about 70 micrometers, at least about 80 micrometers, at least about 90 micrometers, at least about 100 micrometers, at least about 300 micrometers, at least about 500 micrometers, at least about micrometers, at least about 1 mm, at least about 3 mm, etc. Combinations of any of these are also possible; for example, the nonwoven structure may have a porosity between about 30 micrometers and about 1 mm in one embodiment.

In another set of embodiments, the nonwoven structure may have a structure or a porosity such that heat is transmitted through the nonwoven structure preferentially via conduction through the fibers of the nonwoven structure, rather than via convection of gases through the pores of the nonwoven structure. Thus, for example, the nonwoven structure can have structure such that heat is preferentially transmitted through the nonwoven structure via conduction over convection by a factor of at least about 2, at least about 5, at least about 10, at least about 30, at least about 50, at least about 75, at least about 100, at least about 300, at least about 500, at least about 750, at least about 1,000, etc.

For example, in one set of embodiments, the fibers or polymers can be formed of materials that have relatively low heat conductivity. For example, the article may comprise a polymer having a thermal conductivity of no more than about 1.2 W/m K, no more than about 1 W/m K, no more than about 0.8 W/m K, no more than about 0.7 W/m K, no more than about 0.6 W/m K, no more than about 0.5 W/m K, no more than about 0.4 W/m K, no more than about 0.3 W/m K, no more than about 0.25 W/m K, no more than about 0.2 W/m K, no more than about 0.15 W/m K, no more than about 0.1 W/m K, no more than about 0.08 W/m K, no more than about 0.06 W/m K, no more than about 0.05 W/m K, no more than about 0.04 W/m K, no more than about 0.03 W/m K, or no more than about 0.02 W/m K, etc.

In addition, in certain cases, the nonwoven structure may be treated, e.g., chemically. For instance, in one set of embodiments, the nonwoven structure may be treated to reduce heat transfer through the nonwoven structure, and/or to inhibit or resist the spread of fire through the nonwoven structure. For example, any of a variety of flame retardants can be used to treat the nonwoven structure, and the flame retardants can be added before and/or after the nonwoven structure is formed. The flame retardant, for instance, may be applied to the fibers before they are assembled to form the nonwoven structure, or the nonwoven structure, after formation, can be exposed to flame retardant by any suitable technique. In some embodiments, the flame retardant may be sprayed onto the nonwoven structure, the nonwoven structure may be dipped or immersed in flame retardant (e.g., contained within a suitable container), the flame retardant may be painted onto the nonwoven structure, the flame retardant may be electrostatically bonded to the nonwoven structure, or the like. The fibers, in some cases, can become partially or fully impregnated with the flame retardant, and/or the flame retardant may form a shell or coating around one or more of the fibers within the nonwoven structure. In some instances, the fibers are saturated in flame retardant.

Examples of flame retardants include, but are not limited to, minerals such as aluminum hydroxide, aluminum oxide, aluminum trihydrate, magnesium carbonate hydroxide, magnesium hydroxide, huntite, hydromagnesite, hydrates, red phosphorus, boron compounds such as zinc borate or sodium borate, zinc carbonate, antimony trioxide, antimony pentoxide, sodium antimonate, sodium carbonate, antimony carbonate, aluminum carbonate, etc.; organochlorines such as chlorendic acid derivatives and chlorinated paraffins; organobromines such as polybrominated diphenylethers, decabromodiphenyl ether, decabromodiphenyl ethane, hexabromobutene, dibromoethyl dibromocyclohexane, hexabromocyclododecane, diboromoneopentyl glycol, tribromoneopentyl alcohol, brominated aliphatic polyol, polyethertriol, octabromodiphenyl ether, pentabromodiphenyl ether, fully brominated diphenoxy benzene, decabromodiphenyl ether, octabromodiphenylether, pentabromodiphenylether, (bis-pentabromophenyl)ethane, brominated trimethylphenylindan, tetrabromobisphenol A, bis(tribromophenoxy)ethane, polydibromophenylene oxide, tetrabromophthalic anhydride, 1,2-bis(tetrabromophthalimide)ethane, tetrabromophthalate diols, tetrabromophthalate esters, tetrabromobisphenol A, polydibromophenylene oxide, brominated polystyrene, poly(pentabromobenzyl) acrylate, polymeric brominated compounds such as brominated polystyrenes, brominated carbonate oligomers, brominated epoxy oligomers, tetrabromophthalic anyhydride, tetrabromobisphenol A, hexabromocyclododecane, etc.; sulfamic acid or sulfamates; sulfamides; or organophosphorous or organophosphate compounds such as tris(2,3-dibromopropyl)phosphate, triphenyl phosphate, tris-dichloropropyl phosphate, cresyldiphenyl phosphate, resorcinol bis(diphenylphosphate), bisphenol A bis(diphenyl phosphate), melamine phosphate, tri-o-cresyl phosphate, dimethyl methylphosphonate, phosphinates, tri-m-cresyl phosphate, tris(2-chloropropyl)phosphate, tris-(1.3-dichloro-2-propyl)phosphate, tris(chloroethyl)phosphate, trisdichloropropylphosphate, tri-p-cresyl phosphate, trischloropropylphosphate, tris(chloroisopropyl)phosphate, tri(isopropylphenyl)phosphate, tetrakis(2-chloroethyl) dichloroisopentyldiphosphate, dimethyl methyl phosphonate, 9,10-dihydro-9-oxa-10-phosphaphenanthrene-10-oxide, 6-(2,5-dihydroxyphenyl)-6H-dibenz[c,e][1,2]oxaphosphorine-6-oxide, tetraphenyl resorcinol bis(diphenylphosphate), etc. In addition, combinations of any of these and/or other flame retardants can also be used in other embodiments. For example, the flame retardant that is applied may comprise one, two, three, or more of any of these, and/or other flame retardants.

In addition, the flame retardant may be substantially hydrophobic in some embodiments. For instance, the flame retardant can have a water contact angle of greater than about 75°, greater than about 90°, greater than about 100°, greater than about 120°, greater than about 135°, etc. However, in other embodiments, the flame retardant is not necessarily substantially hydrophobic, or the flame retardant may have water contact angles less than any of these angles.

Accordingly, in one set of embodiments, the nonwoven structure may be substantially resistant to flames or fires. This may be achieved through a combination of any one or more of the selection of materials forming the fibers of the nonwoven structure, the thickness of the nonwoven structure, the arrangement of fibers within the nonwoven structure to control the porosity or the permeability of gases that can pass through the nonwoven structure, the addition of one or more flame retardants, and the like.

In another set of embodiments, the nonwoven structure (and/or the foam layer(s), as discussed below) may be treated with an antimicrobial agent. Any of a wide variety of antimicrobial agents may be used, including antibacterials, antifungals, antiseptics, or the like. The antimicrobial agents can be added to the nonwoven structure before and/or after the nonwoven structure is formed, or the nonwoven structure, after formation, may be exposed to antimicrobials by any suitable technique, such as spraying or dipping, etc.

Examples of antimicrobial agents include, but are not limited to, organic acids such as lactic acid, citric acid, acetic acid, and their salts; metals such as copper or silver (e.g., which may be impregnated within polymers such as those contained within the composite); Silpure (which also contains silver) or Ultra-Fresh DM-50 (Thompson Research); or oils such as cinnamon oil, clove oil, eucalyptus oil, garlic oil, oregano oil, lavender oil, leleshwa oil, lemon oil, lemon myrtle oil, mint oil, neem oil, black cumin oil, onion oil, peppermint oil, sandalwood oil, ironwort, tea tree oil, or thyme oil. Examples of antibacterials and antiseptics include, but are not limited to, alcohols; quaternary ammonium compounds such as benzalkonium chloride, cetyl trimethylammonium bromide, cetylpyridinium chloride, benzethonium chloride, chlorhexidine, octenidine; boric acid; aldehydes such as formaldehyde and glutaraldehyde; or phenolics such as phenol, o-phenylphenol, chloroxylenol, hexachlorophene, thymol, or the like. Non-limiting examples of antifungals include tea tree oil, cinnamaldehyde, cinnamon essential oil, jojoba oil, neem oil, rosemary oil, monocerin, or the like.

In another set of embodiments, the nonwoven structure (and/or a foam, as discussed below) is hydrophobic, or is treated to render it hydrophobic. For example, the nonwoven structure may have a water contact angle of greater than about 75°, greater than about 90°, greater than about 100°, greater than about 120°, greater than about 135°, etc. Examples of suitable treatments include, but are not limited to, fluorinated hydrocarbons (e.g., having 5, 6, 7, or 8 carbons) such as fluoroalkyl esters, perfluoroacrylates, trifluorinated hydrocarbons, tetrafluorinated hydrocarbons, fluorinated acrylates, perfluoroacrylates, silicones such as reactive organosilicones, polysiloxanes such as polydimethylsiloxanes or polymethylhydrogensiloxanes, or the like. However, in other embodiments, the nonwoven structure and/or foam is not necessarily substantially hydrophobic, and/or the nonwoven structure and/or foam may have water contact angles less than any of these angles. In one set of embodiments, the nonwoven structure and/or foam is hydrophobic or water-repellent, and/or is treated such that it absorbs less than 4% water by weight after 96 hours, e.g., as discussed in the ASTM D2842 water absorption test (Standard Test Method for Water Absorption of Rigid Cellular Plastics), incorporated herein by reference.

As previously discussed, the nonwoven structure comprises a foam, in certain embodiments of the invention. Any suitable foam can be used, including open-cell foams and closed-cell foams, as well as combinations thereof. If the article comprises a plurality of closed cells, the cells may have substantially the same or substantially different volumes, shapes, or dimensions. The foam may also have any average cell size, which can be readily determined using techniques known to those of ordinary skill in the art, e.g., such as microscopic techniques. For example, the foam can have a number average cell size (with cell size being the smallest cross-sectional dimension of the cell) determined by microscopy or a mean flow pore size determined by porometry of less than about 1 cm, less than about 5 mm, less than about 3 mm, less than about 1 mm, less than about 0.5 mm, less than about 0.3 mm, or less than about 0.2 mm. The average cell size may also be less than about 100 micrometers, less than about 90 micrometers, less than about 80 micrometers, less than about 70 micrometers, less than about 60 micrometers, less than about 50 micrometers, less than about 40 micrometers, less than about 30 micrometers, less than about 20 micrometers, less than about 10 micrometers, etc. The foam may also, in certain instances, have an average cell size of at least about 10 micrometers, at least about 20 micrometers, at least about 30 micrometers, at least about 40 micrometers, at least about 50 micrometers, at least about 60 micrometers, at least about 70 micrometers, at least about 80 micrometers, at least about 90 micrometers, at least about 100 micrometers, at least about 200 micrometers, at least about 300 micrometers, at least about 500 micrometers, at least about 1 mm, at least about 3 mm, at least about 5 mm, at least about 1 cm, etc. The foam can also have an average cell size that falls between any two of the above stated ranges, e.g., the foam may have an average cell size of between about 1 mm and about 5 mm. Techniques known to those of ordinary skill in the art, such as microscopy or electron microscopy, capillary flow porometry, etc. may be used to determine the average cell size.

The foam may be substantially flame resistant and/or the foam may be acoustic insulating, e.g., due to the presence of cells within the foam, in some cases. For example, the foam can have relatively low permeability to gases such as air or other types of gases. The foam can also provide structural support to the composite in certain embodiments. For instance, the foam may provide rigidity or structural stability to the nonwoven structure such that the resulting composite has a specific, defined shape, e.g., that the composite tries to return to when perturbed. (In contrast, a loose piece of fabric lacks such a specific defined shape, and can adopt a variety of stable arrangements when perturbed.) In some cases, the foam cannot be permanently deformed by an unassisted human being of average strength, or the foam cannot be bent by an unassisted human being of average strength. The foam may also be self-supporting or load-bearing, as discussed below. However, in other cases, the foam is flexible or readily deformable or bent by an unassisted human being of average strength, or the foam may not be load-bearing (for example, the foam may be incapable of bearing a load of the same weight of the foam without being bent or otherwise deformed). In addition, in certain embodiments, the foam can comprise or contain one or more flame retardants, including any of those described herein.

Non-limiting examples of foams that can be used include, but are not limited to, polymeric foams such as Styrofoam, polyurethane foams, polyvinylidene fluoride foams, polyimide foams, latex foams, polyetherimide foams, melamine foams, or the like. The foam may comprise only one of these polymers, or in some instances, the foam comprises more than one of these polymers. The foam can also be a syntactic foam in certain cases, and/or the foam may comprise other materials, such as cenospheres, glass microspheres, carbon microspheres, polymeric microspheres, etc. The microspheres, if present, can be solid or hollow.

The foam can have any suitable density. For example, the density of the foam may be at least about 0.001 g/cm$^3$, at least about 0.002 g/cm$^3$, at least about 0.004 g/cm$^3$, at least about 0.006 g/cm$^3$, at least about 0.008 g/cm$^3$, at least about 0.01 g/cm$^3$, at least about 0.02 g/cm$^3$, at least about 0.4 g/cm$^3$, at least about 0.06 g/cm$^3$, at least about 0.08 g/cm$^3$, at least about 0.1 g/cm$^3$, at least about 0.2 g/cm$^3$, at least about 0.3 g/cm$^3$, at least about 0.4 g/cm$^3$, at least about 0.5 g/cm$^3$, at least about 0.6 g/cm$^3$, at least about 0.7 g/cm$^3$, at least about 0.8 g/cm$^3$, at least about 0.9 g/cm$^3$, at least about 1 g/cm$^3$, at least about 2 g/cm$^3$, at least about 3 g/cm$^3$, etc. In some cases, the density of the foam may be no more than about 1 g/cm$^3$, no more than about 0.9 g/cm$^3$, no more than about 0.8 g/cm$^3$, no more than about 0.7 g/cm$^3$, no more than about 0.6 g/cm$^3$, no more than about 0.5 g/cm$^3$, no more than about 0.4 g/cm$^3$, no more than about 0.3 g/cm$^3$, no more than about 0.2 g/cm$^3$, no more than about 0.1 g/cm$^3$, no more than about 0.08 g/cm$^3$, no more than about 0.06 g/cm$^3$, no more than about 0.04 g/cm$^3$, no more than about 0.02 g/cm$^3$, no more than about 0.01 g/cm$^3$, no more than about 0.008 g/cm$^3$, no more than about 0.006 g/cm$^3$, no more than about 0.004 g/cm$^3$, no more than about 0.002 g/cm$^3$, etc. In some cases, the density of the foam may be a combination of any of these, e.g., the density of the foam may be between about 0.002 g/cm$^3$ and about 0.2 g/cm$^3$.

In one set of embodiments, the foam is substantially planar. The foam may also have the same or a different thickness than the nonwoven structure. In some embodiments, the foam can have a smallest dimension of about 15 inches or less, about 12 inches or less, about 11 inches or less, about 10 inches or less, about 9 inches or less, about 8 inches or less, about 7 inches or less, about 6 inches or less, about 5 inches or less, about 4 inches or less, about 3 inches or less, about 2.5 inches or less, about 2 inches or less, about 1.5 inches or less, about 1 inch or less, about 0.75 inches or less, about 0.5 inches or less, about 0.25 inches or less, about 0.1 inches or less, etc. In some cases, the foam may have a smallest dimension that is at least about 0.1 inches, at least about 0.25 inches, at least about 0.5 inches, at least about 0.75 inches, at least about 1 inch, at least about 1.5 inches, at least about 2 inches, at least about 2.5 inches, at least about 3 inches, at least about 4 inches, at least about 5 inches, at least about 6 inches, at least about 7 inches, at least about 8 inches, at least about 9 inches, at least about 10 inches, at least about 11 inches, at least about 12 inches, etc. The foam may also fall within any combination of these; for instance, the foam can have a smallest dimension that is between about 3 inches and about 5 inches.

The foam may be attached or immobilized to or by the nonwoven structure by any suitable technique. The foam can be directly attached to the nonwoven structure, e.g., as is shown in FIG. 1, or there may be one or more materials located between the foam and the nonwoven structure. Thus, for example, in one set of embodiments, the composite comprises a nonwoven structure comprising first fibers and second fibers, and a foam immobilized to or by the nonwoven structure. Any suitable technique can be used for attaching or immobilizing the foam and the nonwoven structure to each other, and/or to other materials, and in some cases, more than one technique may be used. Examples include, but are not limited to, adhesives or needling, as discussed below. In addition, in some embodiments, the nonwoven structure can wrap around or envelope the foam. For example, the nonwoven structure may be formed as a pocket that the foam is inserted into. In some cases, the nonwoven structure may be closed in order to contain the foam within the pocket, e.g., via needling, adhesives, or the like. An adhesive may be used, in some embodiments, to attach the foam and the nonwoven structure to each other and/or to other materials within the composite. The adhesive may be added before and/or after the nonwoven structure is formed. If adhesives are used in more than one location within the composite, the adhesives can the same or different.

Non-limiting examples of adhesives include epoxies, heat-sensitive adhesives, monomer- or polymer-based glues such as, but not limited to, acrylates, acrylonitriles, cyanoacrylates, acrylics, resorcinol glue, epoxy resins, epoxy putties, ethylene-vinyl acetates, nylons, olefins, phenol formaldehyde resins, polyamides, polyesters, polyester resins, polyethylenes, polypropylenes, polysulfides, polyurethanes, polyvinyl acetates, polyvinyl alcohols, polyvinyl chlorides and polyvinyl chloride emulsions, polyvinylpyrrolidones, rubber cements, silicones, styrene acrylic copolymers, or the like. As another example, in one set of embodiments, the adhesive is a pressure-sensitive adhesive. In some embodiments, the pressure-sensitive adhesive may comprise a polymer and a resin. The resin may be, for example, a rosin or a rosin derivative, a terpene or a modified terpene, an aliphatic, cycloaliphatic, or aromatic resins (e.g., $C_5$ aliphatic resins, $C_9$ aromatic resins, etc.), a hydrogenated hydrocarbon resin, silicate resins such as monofunctional trimethyl silanes reacted with quadrafunctional silicon tetrachloride, or a mixture of these any/or other resins (for example, a terpene-phenol resin). Examples of suitable polymers for the adhesive include, but are not limited to, acrylics, butyl rubber, ethylene vinyl acetate, natural rubber, nitriles, silicone rubbers, styrene block copolymers, styrene-butadiene-styrene copolymers, styrene-ethylene/butylene-styrene copolymers, styrene-ethylene/propylene copolymers, styrene-isoprene-styrene copolymers, and the like.

However, not all embodiments of the invention require the use of adhesives. For instance, in another set of embodiments, the foam and the nonwoven structure are needled together, and/or to other materials within the composite. In some cases, the foam and/or the nonwoven structure may be attached or immobilized together using suitable fibers or threads. One or more than one type of fiber or thread can be used, depending on the application. For example, in one set of embodiments, one or more fibers are inserted or needled through the foam or the nonwoven structure (and/or through other materials, if present) in order to immobilize these together. Examples of suitable fibers include any of those described herein, e.g., cotton or other plant fibers, wood fibers, animal fibers, glass fibers, fiberglass, carbon fibers, mineral fibers, metallic fibers, synthetic or polymeric fibers, etc. In some cases, however, no separate immobilization fibers are added, and needling may be sufficient to attach or immobilize the foam and the nonwoven structure together (and/or to other materials, if present)

If needling techniques such as needlepunching or needlefelting are used, the needles may be inserted at any suitable density to attach or immobilize the foam and the nonwoven structure together, and/or to other materials in the composite. For example, the density of needle insertions may be at least about 1 insertion/in$^1$, at least about 3 insertions/in$^2$, at least about 5 insertions/in$^2$, at least about 10 insertions/in$^2$, at least about 30 insertions/in$^2$, at least about 50 insertions/in$^2$, at least about 100 insertions/in$^2$, at least about 300 insertions/in$^2$, at least about 500 insertions/in$^2$, at least about 1,000 insertions/in$^2$, at least about 3,000 insertions/in$^2$, at least about 5,000 insertions/in$^2$, at least about 10,000 insertions/in$^2$, at least about 30,000 insertions/in$^2$, at least about 50,000 insertions/in$^2$, at least about 100,000 insertions/in$^2$, at least about 300,000 insertions/in$^2$, at least about 500,000 insertions/in$^2$, at least about 1,000,000 insertions/in$^2$, etc. In some cases the insertions may be limited so that the insertions do not substantially damage or destroy the foam. Thus, for example, there may be no more than about 1,000,000 insertions/in$^2$, no more than about 500,000 insertions/in$^2$, no more than about 300,000 insertions/in$^2$, no more than about 100,000 insertions/in$^2$, no more than about 50,000 insertions/in$^2$, no more than about 30,000 insertions/in$^2$, no more than about 10,000 insertions/in$^2$, no more than about 5,000 insertions/in$^2$, no more than about 3,000 insertions/in$^2$, no more than about 1,000 insertions/in$^2$, no more than about 500 insertions/in$^2$, no more than about 300 insertions/in$^2$, no more than about 100 insertions/in$^2$, no more than about 50 insertions/in$^2$, no more than about 30 insertions/in$^2$, no more than about 10 insertions/in$^2$, etc. Combinations of any of the above insertion values are also possible in some embodiments.

The composite may also contain other materials or layers in addition to the nonwoven structure and the foam, in certain embodiments of the invention. For example, the composite can comprise other layers or materials such as backing or protective layers or materials, woven structures, other nonwoven structures, layers or materials that provide structural support or flexibility to the composite, layers or materials to provide flame resistance and/or thermal and/or acoustic insulation, or the like. In one set of embodiments, a composite may comprise a nonwoven structure and a foam as discussed herein, attached to an article such as those described in a U.S. patent application entitled "Composites and Articles Made From Nonwoven Structures," filed on Mar. 15, 2013, incorporated herein by reference in its entirety. As another example, a composite may comprise more than one nonwoven structure and/or more than one foam, each as described herein, optionally attached to any article described in the above U.S. patent application.

In one embodiment, one or more woven structures may be attached or immobilized to the nonwoven structure and/or the foam, and/or otherwise be present in the final composite. The one or more woven structures may be attached or immobilized by any suitable technique, e.g., via adhesion, needling, quilting, stichbonding, or the like, e.g., as discussed herein. The woven structures may have the same or different fiber composition than the nonwoven structure. Additional woven, if present, may be formed from any of the fibers discussed herein, and have any lengths, diameters, densities, etc. described herein with respect to nonwoven structures, in various embodiments of the invention.

Figure 5:
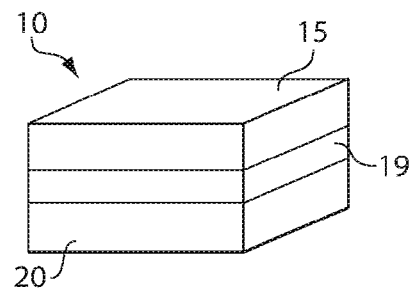
FIG. 5 illustrates a composite in accordance with another embodiment of the invention.

For example, the composite may include more than one nonwoven structure and/or more than one foam layer. Examples of such structures are shown in FIGS. 2-5. For example, in FIG. 2, composite 10 includes a first nonwoven structure 15, foam 20, and a second nonwoven structure 16; in FIG. 3, composite 10 includes nonwoven structure 15, first foam 20, and second foam 21; and in FIG. 4, composite 10 includes two separate nonwoven structures 15 and 16 and two separate foams 20 and 21. FIG. 5 shows composite 10, which includes nonwoven structure 15 and foam 20, separated by an intermediate material 19. As a non-limiting example, intermediate material 19 may be a woven structure. As mentioned, if more than two foams are present, the two foams may independently have the same or different compositions; and, if more than two nonwoven structures are present, the two nonwoven structures may independently have the same or different compositions.

As another example, the foam and the nonwoven structure may be combined with other materials such as bulk bolding materials, FRP (fiberglass reinforced panels) sheets, pre-pregs, veils, or the like to form the composite. In some cases, the pre-preg may comprise carbon fibers, fiberglass fibers, woven or nonwoven materials, etc. that are impregnated with resins such as epoxy resins, phenolic resins, or other resins such as those described herein.

As mentioned, the composite may have any suitable shape or size. For example, the composite may be substantially planar, as is generally depicted in FIGS. 1-5. However, this is for ease of presentation, and in other embodiments, the composite need not have a substantially planar structure. For example, the composite, in some cases, may have a specific shape (e.g., an irregular shape, plane curve, manifold, etc.) that is useful for a certain application. As examples, the composite may be a shaped or molded as a component within a car, truck, train, ship, boat, aircraft, or other vehicle, as a floor covering (or part of a floor covering), as construction material (or as a part thereof), or the like. As a specific non-limiting example, the composite may form part of the wall of an interior of a car, truck, train, ship, boat, aircraft, or other vehicle, and accordingly the composite may have a suitable shape for such an application.

In some cases, the composite has a degree of rigidity or structural stability such that the composite is self-supporting, e.g., such that the composite can maintain its shape regardless of orientation or positioning of the composite, and/or such that the composite does not collapse, change its shape, or visually sag under its own weight. In some cases, the composite has a specific, defined shape that the composite tries to return to when perturbed. In addition, in some embodiments, the composite may have sufficient structural stability such that the composite cannot be permanently deformed or bent by an unassisted human being of average strength; for example, the human being may be unable to significantly deform the composite, or the human being may be able to deform the composite, but upon release, the composite returns substantially to its original shape prior to the deformation.

Additionally, in some cases, the composite has a degree of rigidity or structural stability that allows it to bear loads (i.e., weight). For example, the composite may be able to bear a certain amount of weight without showing substantial deformation (e.g., deformation that can be readily identified by the naked eye). In some cases, the composite is able to bear at least about 10% of its weight, at least about 25% of its weight, at least about 50% of its weight, at least about 75% of its weight, at least about 100% of its weight, at least about 200% of its weight, at least about 300% of its weight, or at least about 500% of its weight, e.g., without showing substantial deformation that can be readily identified by the naked eye.

In certain embodiments, the composite (e.g., comprising a nonwoven structure and a foam) may show a surprising degree of fire or flame resistance. For example, the composite may resist burning or ignition (e.g., when exposed to an open flame). Although composites comprising foams and nonwoven materials exist in other applications, such composites typically do not exhibit high degrees of fire or flame resistance, and can easily ignite or burn under the proper conditions. It should be understood that such fire or flame resistance is not created solely through the selection of relatively nonflammable materials or the addition of flame retardants to the nonwoven structure and/or the foam within the composite, but also depends on a variety of other factors such as the arrangement of the fibers in the nonwoven structure, the density of fibers in the nonwoven structure, the permeability of the nonwoven structure and/or the foam, the cellular structure of the foam, the arrangement of the nonwoven structure relative to the foam, the thickness of the nonwoven structure and/or the foam, and the like. Without wishing to be bound by any theory, it is believed that the high surface area and the ability to gases to penetrate a nonwoven structure can, in some instances, cause even nonwoven structures formed from normally relatively nonflammable materials to exhibit a high degree of flammability. Merely selecting nonflammable materials for use within a composite is accordingly not necessarily sufficient to ensure that the resulting composite will also be nonflammable.

For example, in some embodiments, the nonflammability of a composite may be increased by selecting nonwoven materials that exhibit a relatively low degree of permeability to air, or other gases. For instance, as previously discussed, the nonwoven structure can be constructed and arranged such that some air (or other gases, e.g., flammable gases) can pass through the nonwoven structure, but not larger amounts that could potentially facilitate burning or combustion. Such a nonwoven structure may be advantageous because gases are permitted to pass or diffuse through and exit the nonwoven structure, rather than build up within or on one side of the nonwoven structure, but the gas flow does not reach levels where the exiting gases potentially facilitate increased burning or combustion. One simple screening test to identify such nonwoven structures is to create a pressure differential of 0.5 inches of water across a nonwoven structure, place an open flame on the low pressure side, and determine if the open flame increases (e.g., becomes bigger or more intense) due to gas (e.g., air) passing across the nonwoven structure due to the pressure differential, for example, as compared to no such pressure differential. As another example of a screening test, the composite may be constructed and arranged such that, when substantially the entire outer surface of the composite is exposed to a radiant heat flux of 1.7 W/cm$^2$ and an open pilot flame, the composite exhibits no flame propagation beyond 2 inches and no flame time beyond 3 seconds after exposure to the open pilot flame for 15 or 30 seconds. For example, in one embodiment, a nonwoven structure comprising first fibers and second fibers, as discussed herein, and a foam immobilized to or by the nonwoven structure can be constructed and arranged to meet this test. The second fibers may have a composition different from the first fibers. As yet another example of screening test, the composite may be constructed and arranged such that, when the composite (mounted horizontally or vertically) is exposed to a 1700° F. flame for 5 minutes, the flame does not penetrate the composite.

As a non-limiting example, in one set of embodiments, the composite may be constructed and arranged such that, when substantially the entire outer surface of the composite is exposed to a radiant heat flux of 1.7 W/cm$^2$ and an open pilot flame, the composite exhibits no flame propagation beyond 2 inches and no flame time beyond 3 seconds after exposure to the open pilot flame for 15 seconds or 30 seconds. The composite may comprise a nonwoven structure comprising first fibers and second fibers, and a foam immobilized to or by the nonwoven structure. In some cases, the first fibers comprise polyacrylonitrile and/or the second fibers comprise polyetherimide.

Such composites, due to their surprising degree of fire or flame resistance, may be useful in applications where fire safety is of great concern. In some embodiments, such composites may find use in vehicles such as cars, trucks, trains, ships, boats, aircraft, etc., or within buildings (e.g., within construction materials or floor coverings), where there is danger from fire. In certain cases, the nonwoven structure and/or the composite may satisfy the flammability test defined in 14 C.F.R. §25(App. F)(VI) (2012) or the flame penetration resistance test defined in 14 C.F.R. §25(App. F)(III) (2012), each incorporated herein by reference. As an example, in one embodiment, the composite may comprise a nonwoven structure comprising first fibers and second fibers, e.g., as discussed herein, and a foam immobilized to or by the nonwoven structure, where the composite is constructed and arranged to satisfy this flammability test.

For instance, in one embodiment, a composite may be constructed and arranged to satisfy the flame penetration resistance test defined in 14 C.F.R. §25(App. F)(III) (2012). The composite may comprise a nonwoven structure comprising first fibers and second fibers, and a foam immobilized to or by the nonwoven structure. In some cases, the first fibers comprise polyacrylonitrile and/or the second fibers comprise polyetherimide. As another example, a composite may be constructed and arranged to satisfy the flammability test defined in 14 C.F.R. §25(App. F)(VI) (2012). The composite may comprise a nonwoven structure comprising first fibers and second fibers, and a foam immobilized to or by the nonwoven structure. In some cases, the first fibers comprise polyacrylonitrile and/or the second fibers comprise polyetherimide.

Such applications are often highly regulated, and many composites comprising foams and/or nonwoven materials cannot meet these tests. However, composites having properties such as those described herein can meet such regulations by controlling various factors such as the selection of nonflammable materials within the nonwoven structure and/or foam, the porosity or the permeability of the nonwoven structure, the cell structure of the foam, the thickness of the nonwoven structure and/or the foam, and the like, as is described herein.

In addition, in some embodiments, the composite may have a relatively high degree of soundproofing or acoustic insulation. In some embodiments, a relatively high degree of soundproofing or acoustic insulation is achieved using nonwoven structures and/or foams that do not have high permeabilities to air or other gases; since sound waves typically travel through air, nonwoven structures and/or foams having relatively low permeabilities to air may, in some cases, exhibit a high degree of soundproofing or acoustic insulation. The mass of the composite and/or its thickness may also affect the degree of soundproofing in some instances, e.g., thicker materials in general produce better acoustic insulation. However, it should be noted that some permeability may be required in certain cases, since materials that are too solid or have too little air permeability may effectively as a solid block of material with respect to acoustic waves and allow more sound transmission to occur. Accordingly, merely selecting materials for the composite that have relatively low permeability to air is not necessarily sufficient to guarantee that the resulting composite will be soundproof or act as a suitable acoustic insulator.

Acoustic insulation of a material can be determined, for example, as acoustic absorption (i.e., the absorption of sound waves into the material), and/or as acoustic transmission (i.e., the degree to which sound waves can pass through the material). Acoustic absorption is typically measured at specific frequencies. For instance, in one set of embodiments, the composite is has sufficient acoustic absorption such that, for sound at a frequency of 500 Hz (e.g., a sine wave), at least about 10% of the sound is absorbed by the composite, and in some cases, at least about 20%, at least about 30%, at least about 40%, at least about 50%, at least about 60%, at least about 70%, or at least about 80% of the sound is absorbed by the composite. In some cases, the composite is sufficiently soundproof such that, for sound at a frequency of 1 kHz, at least about 10% of the sound is absorbed by the composite, and in some cases, at least about 20%, at least about 30%, at least about 40%, at least about 50%, at least about 60%, at least about 70%, or at least about 80% of the sound is absorbed by the composite. In certain instances, the composite is sufficiently soundproof such that, for sound at a frequency of 1.5 kHz or 2.5 kHz, at least about 10% of the sound is absorbed by the composite, and in some cases, at least about 20%, at least about 30%, at least about 40%, at least about 50%, at least about 60%, at least about 70%, or at least about 80% of the sound is absorbed by the composite. In one set of embodiments, for sound that is evenly distributed between 20 Hz and 20 kHz, the composite is able to absorb at least about 20%, at least about 30%, at least about 40%, or at least about 50% of the sound. In some cases, the composite is constructed and arranged to absorb at least about 70% of sound having a frequency of 500 Hz that is directed at the composite. The composite may comprise a nonwoven structure comprising first fibers and second fibers, and a foam immobilized to or by the nonwoven structure. In some cases, the first fibers comprise polyacrylonitrile and/or the second fibers comprise polyetherimide. In some cases, however, no more than about 95%, no more than about 90%, no more than about 85%, no more than about 80%, no more than about 75%, or no more than about 70% of the sound is absorbed for any of the ranges described above.

In another set of embodiments, the composite may be able to prevent at least some sound waves from passing through the composite. For example, the sound waves may reflected, absorbed, diffused, etc. by the composite. In one set of embodiments, the composite may cause a reduction in acoustic transmission for a sound wave of about 500 Hz of about 5 dB or more, 10 dB or more, 15 dB or more, 20 dB or more, 25 dB or more, 30 dB or more, 35 dB or more, or 40 dB or more. In some cases, the composite may cause a reduction in acoustic transmission for a sound wave of 1.5 kHz or 2.5 kHz of about 5 dB or more, 10 dB or more, 15 dB or more, 20 dB or more, 25 dB or more, 30 dB or more, 35 dB or more, or 40 dB or more.

Non-limiting examples of testing methods that can be used to determine acoustic absorption and/or acoustic transmission, e.g., at levels such as those discussed above, include ASTM E1050 (Standard Test Method for Impedance and Absorption of Acoustical Materials Using a Tube, Two Microphones and a Digital Frequency Analysis System), ASTM E2611 (Standard Test Method for Measurement of Normal Incidence Sound Transmission of Acoustical Materials Based on the Transfer Matrix Method), ASTM C522 (Standard Test Method for Airflow Resistance of Acoustical Materials), ASTM C423 (Standard Test Method for Sound Absorption and Sound Absorption Coefficients by the Reverberation Room Method), or ASTM E90 or ASTM E90-2 (Standard Test Method for Laboratory Measurement of Airborne Sound Transmission Loss of Building Partitions and Elements), each of which is incorporated herein by reference. In addition, in some embodiments, the composite can be both relatively flame resistant and acoustically insulating.

Another aspect of the present invention is generally directed to systems and methods for preparing composites such as those described herein. As previously discussed, in one set of embodiments, a composite is prepared by forming a nonwoven structure from one or more types of fibers, e.g., by entangling the fibers. A foam layer may then be attached to the nonwoven structure; in some cases, other materials may also be present, for example, between the foam and the nonwoven structure, or otherwise form part of the composite. Non-limiting examples include woven structures, backing layers, protective layers, layers or materials that provide structural support or flexibility to the composite, layers or materials to provide flame resistance and/or thermal and/or acoustic insulation, or the like. Such materials can be added to the nonwoven structure and/or the foam, or otherwise form part of the composite, by any suitable technique. Non-limiting examples include adhesion, needling, quilting, stichbonding, enveloping, etc. For instance, in one embodiment, a woven structure may be needled into a nonwoven structure and/or a foam.

Thus, for example, one set of embodiments is directed to a method comprising acts of entangling first fibers and second fibers together to form a nonwoven structure, attaching foam to the nonwoven structure, and heating and/or compressing the foam and the nonwoven structure to form a composite. Examples of suitable temperatures and/or pressures are discussed in more detail below. Optionally, other materials may be added, e.g., a flame retardant, an antimicrobial agent, or the like; the other materials can be added at any suitable point, e.g., before or after formation of the composite, or before or after formation of the nonwoven structure, etc. In addition, in some cases, the nonwoven structure and the foam may be heated and/or compressed together, e.g., to mold the composite into a desired shape and/or thickness.

The fibers used to form the nonwoven structure can be entangled together using various techniques, although the fibers are typically not knitted or weaved together, e.g., as in a fabric material. Examples of suitable techniques include, but are not limited to, needlepunching or needlefelting, thermal bonding, hydroentaglement, ultrasonic bonding, or chemical bonding. Using techniques such as these, the fibers forming the nonwoven structure can be entangled together to form the nonwoven structure. If more than one type of fiber is present, the fibers may be mixed together prior to forming the nonwoven structure, e.g., mechanically. In addition, in some embodiments, the fibers may be substantially aligned, or carded or combed together, prior to forming the nonwoven structure.

For example, in one set of embodiments, the fibers are entangled together to form the nonwoven structure using thermal bonding techniques. The fibers may be placed together and heated to form the nonwoven structure. For instance, in some cases, heat sealers or ovens may be applied to the fibers, and/or the fibers may be calendered through heated rollers (optionally under pressure) in order to form the nonwoven structure. In hydroentaglement, the fibers are entangled together to form the nonwoven structure using water jets. The fibers may also be entangled together using air instead of water, in some embodiments, optionally using ultrasound. Fibers may also be entangled together in chemical bonding techniques using latex emulsion or solution polymers to chemically assemble the fibers into a nonwoven structure. In some cases, binder fibers or powders can also be used to soften or partially melt the fibers to form the nonwoven structure.

In needlepunching or needlefelting, a plurality of needles, typically solid, are used to mechanical entangle or intertwine individual fibers together to form the nonwoven structure. This can be done, for example, by mechanically moving or "punching" the needles repeatedly up and down over the fibers to entangle the fibers together to form the nonwoven structure. In some cases, this may be done at relatively high densities, e.g., at least about 1 insertion/in$^1$, at least about 3 insertions/in$^2$, at least about 5 insertions/in$^2$, at least about 10 insertions/in$^2$, at least about 30 insertions/in$^2$, at least about 50 insertions/in$^2$, at least about 100 insertions/in$^2$, at least about 300 insertions/in$^2$, at least about 500 insertions/in$^2$, at least about 1,000 insertions/in$^2$, at least about 3,000 insertions/in$^2$, at least about 5,000 insertions/in$^2$, at least about 10,000 insertions/in$^2$, at least about 30,000 insertions/in$^2$, at least about 50,000 insertions/in$^2$, at least about 100,000 insertions/in$^2$, at least about 300,000 insertions/in$^2$, at least about 500,000 insertions/in$^2$, at least about 1,000,000 insertions/in$^2$, etc.

The nonwoven structure may be attached or immobilized to or by a foam, or to other materials such as those discussed herein, after or during formation of the nonwoven structure. In some cases, the foam and/or the nonwoven structure is substantially planar, e.g., so that the foam can be attached to one surface of the nonwoven structure, although this is not a requirement in all cases. As mentioned, any suitable technique can be used, including adhesives or needling techniques such as needlepunching or needlefelting, and/or combinations thereof. If an adhesive is used, the adhesive may be attached to any suitable material within the composite. For instance, an adhesive may be sprayed or painted onto one or both of the nonwoven structure or the foam, to other materials forming the composite, etc. In some cases, the adhesive is present as a separate layer or material within the composite, e.g., positioned between the foam and the nonwoven structure. In some cases, the adhesive is also activated to attach or immobilize the materials or layers together to form the composite. For example, pressure-sensitive adhesives may be activated upon application of suitable pressure, heat sensitive adhesives may be activated upon application of suitable temperatures (e.g., to melt or otherwise activate the heat sensitive adhesive), or certain types of epoxies or glues may be activated using suitable activators such as ultraviolet light.

Needling techniques such as needlepunching or needlefelting techniques may also be used in accordance with certain embodiments of the invention, e.g., to attach or immobilize the nonwoven structure to the foam. Needling may be performed independently of the formation of the nonwoven structure, or in some cases, they may be performed at the same time. However, the density of needling insertions to attach the foam (and/or other materials) to the nonwoven structure need not be the same as the density of needling insertions used to form the nonwoven structure, although they can be the same in some embodiments.

In some embodiments, the nonwoven structure and the foam is heated and/or pressed to form the final composite. Heating/compression may be used in some cases to shape or mold the composite, e.g., into a desired shape and/or thickness and/or density and/or porosity. The nonwoven structure and the foam may be heated and/or pressed when directly in contact with each other, or there may be other materials present between the nonwoven structure and the foam. In addition, other materials may also be present as well, e.g., to form the composite. In addition, in certain instances, heating or pressing may be used to activate heat-sensitive adhesives or pressure-sensitive adhesives, respectively, that may be present within the composite.

If heating is used, any suitable technique for heating can be used. Examples of suitable techniques include, but are not limited to, heating within an oven or other enclosed temperature controlled environment, electrically resistive heating, radiative heating, exposure to radiation (e.g., infrared radiation), application of heat sources, e.g. via direct surface contact, to the nonwoven structure and/or the foam, or the like. The materials may be heated to any suitable temperature, for example, to temperatures of at least about 60° F., at least about 80° F., at least about 100° F., at least about 120° F., at least about 140° F., at least about 160° F., at least about 180° F., at least about 200° F., at least about 220° F., at least about 240° F., at least about 260° F., at least about 280° F., at least about 300° F., at least about 325° F., at least about 350° F., at least about 375° F., at least about 400° F., etc. However, in some cases, the temperature may be no more than about 500° F., no more than about 450° F., no more than about 400° F., no more than about 375° F., no more than about 350° F., no more than about 325° F., no more than about 300° F., no more than about 280° F., no more than about 260° F., no more than about 240° F., no more than about 220° F., no more than about 200° F., no more than about 180° F., no more than about 160° F., no more than about 140° F., no more than about 120° F., no more than about 100° F., no more than about 80° F., etc. In some embodiments of the invention, the materials can also be heated to a temperature that is within any of these values, e.g., between about 100° F. and about 200° F., to form the composite.

In some cases, the material may be heated to a temperature greater than the glass transition temperature of a polymer within the nonwoven structure, and in some cases, below the melting point of the polymer. Without wishing to be bound by any theory, it is believed that heating the polymer to a temperature between the glass transition temperature and the melting temperature may serve to cause the polymer to increase in density or crystallinity. For example, the density or specific gravity of the polymer may increase; this may cause the polymer to become denser, which may also cause the resulting material to become stiffer. In addition, after heating, the degree of crystallinity within the polymer may increase by at least about 5%, at least about 10%, at least about 15%, at least about 20%, at least about 25%, etc. In some cases, the crystallinity may increase by no more than about 30%, no more than about 25%, no more than about 20%, no more than about 15%, no more than about 10%, etc., or combinations of these (e.g., between about 10% and about 20%). In general, more crystalline polymers may exhibit greater resistance to heat transfer or lower heat capacity.

Polymers are typically composed of long molecular chains which are irregular and often entangled, depending on their length. While most polymers are generally disordered, such polymers typically will exhibit some degree of alignment of the polymer chains, and those regions are said to be aligned, creating regions called semicrystalline regions. The semicrystalline regions are typically roughly 1 micrometer in size, although the degree of crystallinity and the size of the semicrystalline regions may vary based on factors such as the size and orientation of the molecular chains, the synthesis technique, and the monomers forming the polymer. The degree of crystallinity in a polymer can be determined using techniques such as X-ray diffraction (XRD) or other X-ray scattering techniques known to those of ordinary skill in the art.

In addition, in some embodiments, pressure may be applied to the materials to form the composite, e.g., instead of or in addition to heating. If both heating and pressure are used, the materials may be subject to pressure before, during, and/or after heating, depending on the application. In addition, any suitable technique can be used to apply pressure to the nonwoven structure and the foam, including applying the pressure pneumatically, mechanically, hydraulically, and/or placing the nonwoven structure and the foam in a high-pressure gas chamber.

In one set of embodiments, the applied pressure may be at least about 5 psi (gauge pressure), at least about 10 psi, at least about 25 psi, at least about 50 psi, at least about 100 psi, at least about 125 psi, at least about 150 psi, at least about 200 psi, at least about 250 psi, at least about 300 psi, at least about 400 psi, at least about 500 psi, at least about 600 psi, at least about 700 psi, at least about 800 psi, at least about 900 psi, at least about 1,000 psi, at least about 1,250 psi, at least about 1,500 psi, at least about 1,750 psi, at least about 2,000 psi, at least about 2,250 psi, at least about 2,500 psi, at least about 2,500 psi, at least about 2,750 psi, at least about 3,000 psi, at least about 3,500 psi, at least about 4,000 psi, at least about 4,500 psi, at least about 5,000 psi, etc. (1 psi is 6894.757 Pa.) The pressure may also be, in some embodiments, no more than about 4,500 psi, no more than about 4,000 psi, no more than about 3,500 psi, no more than about 3,000 psi, no more than about 2,750 psi, no more than about 2,500 psi, no more than about 2,500 psi, no more than about 2,250 psi, no more than about 2,000 psi, no more than about 1,750 psi, no more than about 1,500 psi, no more than about 1,250 psi, no more than about 1,000 psi, no more than about 900 psi, no more than about 800 psi, no more than about 700 psi, no more than about 600 psi, no more than about 500 psi, no more than about 400 psi, no more than about 300 psi, no more than about 250 psi, no more than about 200 psi, no more than about 150 psi, no more than about 125 psi, no more than about 100 psi, no more than about 50 psi, no more than about 25 psi, no more than about 10 psi, etc. In addition, the pressure can be contained within any of these values, e.g., a pressure of between about 100 psi and about 400 psi.

Such heat and/or pressures may be applied for any suitable time. The heat and/or pressure may be steadily applied, or in some cases, the heat and/or pressure may vary with respect to time. If both heat and pressure are used, the times each are applied may be the same or different, and can be, for example, about 1 minute or more, about 2 minutes or more, about 3 minutes or more, about 4 minutes or more, about 5 minutes or more, about 6 minutes or more, about 7 minutes or more, about 8 minutes or more, about 9 minutes or more, about 10 minutes or more, about 12 minutes or more, about 15 minutes or more, about 20 minutes or more, about 25 minutes or more, about 30 minutes or more, about 35 minutes or more, about 40 minutes or more, about 45 minutes or more, about 50 minutes or more, about 55 minutes or more, about 60 minutes or more, etc.

For example, in one set of embodiments, a method of the invention comprises entangling first fibers and second fibers together to form a nonwoven structure, attaching foam to the nonwoven structure, and heating and/or compressing the foam and the nonwoven structure to form a composite. For instance, in some cases, the composite, when substantially the entire outer surface of the composite is exposed to a radiant heat flux of 1.7 W/cm$^2$ and an open pilot flame, may exhibit no flame propagation beyond 2 inches and no flame time beyond 3 seconds after exposure to the open pilot flame for 15 seconds or 30 seconds.

In some embodiments, other processes can also be applied to a nonwoven structure and/or the foam, e.g., to increase its rigidity or structural stability, in addition or instead of heating and/or pressure. Examples include, but are not limited to, electromagnetic energy (e.g., thermal, ultraviolet radiation), acoustical energy (e.g., ultrasonic energy), chemical enhancement (e.g., salting with other crystal structures), and/or physical manipulation (e.g., elongation, compaction, stretching, etc.). In some cases, more than one of these may be applied, for example, serially, simultaneously, etc.

For example, in one set of embodiments, ultrasound is applied to the nonwoven structure and/or the foam. The ultrasound may have any suitable frequency, e.g., at least about 15 kHz, at least about 20 kHz, at least about 25 kHz, at least about 30 kHz, at least about 35 kHz, at least about 40 kHz, at least about 45 kHz, at least about 50 kHz, or the like, and may be applied using any suitable technique, e.g., an ultrasonic transducer such as those commercially available. In some cases, the frequency is no more than about 60 kHz, no more than about 50 kHz, no more than about 45 kHz, no more than about 40 kHz, no more than about 35 kHz, no more than about 30 kHz, no more than about 25 kHz, no more than about 20 kHz, etc. In addition, the power may be at least about 50 W, at least about 75 W, at least about 100 W, at least about 150 W, at least about 200 W, etc. The ultrasound can also be applied for any length of time, e.g., for about 5 minutes or more, about 10 minutes or more, about 12 minutes or more, about 15 minutes or more, about 20 minutes or more, about 25 minutes or more, about 30 minutes or more, about 35 minutes or more, about 40 minutes or more, about 45 minutes or more, about 50 minutes or more, about 55 minutes or more, about 60 minutes or more, etc.

A U.S. patent application Ser. No. 13/840,966, entitled "Composites and Articles Made From Nonwoven Structures," filed on Mar. 15, 2013, is incorporated herein by reference in its entirety.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, material, kit, and/or method described herein. In addition, any combination of two or more such features, systems, materials, kits, and/or methods, if such features, systems, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A composite, comprising:
   a nonwoven structure comprising first fibers comprising polyacrylonitrile and second fibers comprising polyetherimide; and
   a foam comprising melamine and/or polyvinylidene fluoride and/or polyimide and/or polyetherimide, the foam having open pores having an average cell size of less than about 1 mm, the foam immobilized to or by the nonwoven structure,
   wherein the composite is constructed and arranged such that, when substantially the entire outer surface of the composite is exposed to a radiant heat flux of 1.7 W/cm$^2$ and an open pilot flame, the composite exhibits no flame propagation beyond 2 inches and no flame time beyond 3 seconds after exposure to the open pilot flame for 30 seconds.

2. The composite of claim 1, wherein the nonwoven structure is substantially planar.

3. The composite of claim 2, wherein the foam is immobilized to one surface of the substantially planar nonwoven structure.

4. The composite of claim 1, wherein the foam has a smallest dimension of less than about 4 inches.

5. The composite of claim 1, further comprising an adhesive positioned between the foam and the nonwoven structure.

6. The composite of claim 5, wherein the adhesive comprises a pressure-sensitive adhesive and/or a heat-sensitive adhesive.

7. The composite of claim 1, wherein the first fibers have an average linear mass density of between about 1 Denier and about 4 Denier.

8. The composite of claim 1, wherein the second fibers have an average linear mass density of between about 1 Denier and about 16 Denier.

9. The composite of claim 1, wherein the first fibers and/or the second fibers have an average length of between about 1 inch and about 6 inches.

10. The composite of claim 1, wherein the first fibers and/or the second fibers have an average diameter of between about 1 micrometer and about 30 micrometers.

11. The composite of claim 1, wherein the mass ratio of first fibers to second fibers in the nonwoven structure is between about 10:1 and about 1:10.

12. The composite of claim 1, wherein the nonwoven structure comprises a flame retardant.

13. The composite of claim 12, wherein the flame retardant comprises an organophosphate.

14. The composite of claim 12, wherein the flame retardant is substantially hydrophobic and/or has a water contact angle of greater than 90°.

15. The composite of claim 1, wherein the nonwoven structure further comprises para-aramid fibers.

16. The composite of claim 1, wherein the foam has an open porosity such that, when a pressure differential of 0.5 inches of water is applied across the composite, an open flame on the low pressure side increases due to the pressure differential.

17. The composite of claim 1, wherein the second fibers comprising polyetherimide exhibits crystallinity without showing evidence of flow or melting of the polyetherimide.

18. The composite of claim 1, wherein the composite is prepared by a process comprising applying heat to the nonwoven structure sufficient to increase crystallization of the polyetherimide by at least about 10%.

19. The composite of claim 1, wherein the composite is prepared by a process comprising applying heat to the composite such that the temperature of the composite does not exceed about 400° F.

20. A composite, comprising:
a nonwoven structure comprising first fibers comprising polyacrylonitrile and second fibers comprising polyetherimide; and
a foam comprising melamine and/or polyvinylidene fluoride and/or polyimide and/or polyetherimide, the foam having open pores having an average cell size of less than about 1 mm, the foam immobilized to the nonwoven structure,
wherein the composite is constructed and arranged to satisfy the flammability test defined in 14 C.F.R. §25(App. F)(VI) (2012).

21. The composite of claim 20, wherein the foam has an open porosity such that, when a pressure differential of 0.5 inches of water is applied across the composite, an open flame on the low pressure side increases due to the pressure differential.

22. The composite of claim 20, wherein the second fibers comprising polyetherimide exhibits crystallinity without showing evidence of flow or melting of the polyetherimide.

23. The composite of claim 20, wherein the composite is prepared by a process comprising applying heat to the nonwoven structure sufficient to increase crystallization of the polyetherimide by at least about 10%.

24. The composite of claim 20, wherein the composite is prepared by a process comprising applying heat to the composite such that the temperature of the composite does not exceed about 400° F.

25. A composite, comprising:
a nonwoven structure comprising first fibers comprising polyacrylonitrile and second fibers comprising polyetherimide; and
a foam comprising melamine and/or polyvinylidene fluoride and/or polyimide and/or polyetherimide, the foam having open pores having an average cell size of less than about 1 mm, the foam immobilized to the nonwoven structure,
wherein the composite is constructed and arranged to absorb at least about 70% of sound having a frequency of 500 Hz that is directed at the composite.

26. The composite of claim 25, wherein the foam has an open porosity such that, when a pressure differential of 0.5 inches of water is applied across the composite, an open flame on the low pressure side increases due to the pressure differential.

27. The composite of claim 25, wherein the second fibers comprising polyetherimide exhibits crystallinity without showing evidence of flow or melting of the polyetherimide.

28. The composite of claim 25, wherein the composite is prepared by a process comprising applying heat to the nonwoven structure sufficient to increase crystallization of the polyetherimide by at least about 10%.

29. The composite of claim 25, wherein the composite is prepared by a process comprising applying heat to the composite such that the temperature of the composite does not exceed about 400° F.

30. A composite, comprising:
a nonwoven structure comprising first fibers and second fibers, the second fibers having a composition different from the first fibers; and
a foam comprising melamine and/or polyvinylidene fluoride and/or polyimide and/or polyetherimide, the foam having open pores having an average cell size of less than about 1 mm, the foam immobilized to the nonwoven structure,
wherein the composite is constructed and arranged such that, when substantially the entire outer surface of the composite is exposed to a radiant heat flux of $1.7 \text{ W/cm}^2$ and an open pilot flame, the composite exhibits no flame propagation beyond 2 inches and no flame time beyond 3 seconds after exposure to the open pilot flame for 30 seconds.

31. The composite of claim 30, wherein the foam has an open porosity such that, when a pressure differential of 0.5 inches of water is applied across the composite, an open flame on the low pressure side increases due to the pressure differential.

32. The composite of claim 30, wherein the second fibers comprising polyetherimide exhibits crystallinity without showing evidence of flow or melting of the polyetherimide.

33. The composite of claim 30, wherein the composite is prepared by a process comprising applying heat to the nonwoven structure sufficient to increase crystallization of the polyetherimide by at least about 10%.

34. The composite of claim 30, wherein the composite is prepared by a process comprising applying heat to the composite such that the temperature of the composite does not exceed about 400° F.

35. A composite, comprising:
a nonwoven structure comprising first fibers comprising polyacrylonitrile and second fibers comprising polyetherimide; and
a foam comprising melamine and/or polyvinylidene fluoride and/or polyimide and/or polyetherimide, the foam immobilized to the nonwoven structure,
wherein the composite is constructed and arranged to satisfy the flame penetration resistance test defined in 14 C.F.R. §25(App. F)(III) (2012).

36. A method, comprising: entangling first fibers comprising polyacrylonitrile and second fibers comprising polyetherimide together to form a nonwoven structure; attaching foam comprising melamine and/or polyvinylidene fluoride and/or polyimide and/or polyetherimide to the nonwoven structure, the foam having open pores having an average cell size of less than about 1 mm; and heating and/or compressing the foam and the nonwoven structure to form a composite, wherein the composite, when substantially the entire outer surface of the composite is exposed to a radiant heat flux of 1.7 W/cm2 and an open pilot flame, exhibits no flame propagation beyond 2 inches and no flame time beyond 3 seconds after exposure to the open pilot flame for 30 seconds.

* * * * *